United States Patent
Mock

(10) Patent No.: US 10,993,577 B2
(45) Date of Patent: May 4, 2021

(54) METHOD AND DEVICE FOR APPLYING DECORATIVE EFFECTS TO A MULTILAYERED COFFEE SURFACE

(71) Applicant: Herbert Mock, Steinakirchen (AT)

(72) Inventor: Herbert Mock, Steinakirchen (AT)

(*) Notice: Subject to any disclaimer, the term of this patent is extended or adjusted under 35 U.S.C. 154(b) by 273 days.

(21) Appl. No.: 16/309,020

(22) PCT Filed: Jun. 21, 2017

(86) PCT No.: PCT/EP2017/065288
§ 371 (c)(1),
(2) Date: Dec. 11, 2018

(87) PCT Pub. No.: WO2017/220679
PCT Pub. Date: Dec. 28, 2017

(65) Prior Publication Data
US 2019/0174951 A1 Jun. 13, 2019

(30) Foreign Application Priority Data
Jun. 21, 2016 (AT) .............................. A 50560/2016

(51) Int. Cl.
*A47J 31/44* (2006.01)
*A23P 30/00* (2016.01)
(Continued)

(52) U.S. Cl.
CPC ........... *A47J 31/4496* (2013.01); *A23P 30/00* (2016.08); *A47J 31/00* (2013.01); *A23P 2020/253* (2016.08)

(58) Field of Classification Search
CPC ..................... A23P 30/00; A23P 2020/253
See application file for complete search history.

(56) References Cited

U.S. PATENT DOCUMENTS 5,131,598 A * 7/1992 Hoogeveen, Jr. ....... B05B 3/087
239/223
2009/0074928 A1 3/2009 Pikalo
(Continued)

FOREIGN PATENT DOCUMENTS

CN 204394253 * 6/2015
FR 2495317 A1 6/1982
(Continued)

OTHER PUBLICATIONS

English Translation for CN204394253 published Jun. 2015.*
(Continued)

*Primary Examiner* — Anthony J Weier
(74) *Attorney, Agent, or Firm* — Lucas & Mercanti, LLP; Klaus P. Stoffel

(57) ABSTRACT

In order to apply decorative effects to a multilayered coffee surface, particulary a crema, a focused air jet for drawing or writing is contactlessly guided across the surface, wherein the air jet pressure at the action point is selected to overcome the surface tension of the multilayered surface and to produce swirls between the individual layers. To carry out this method, a wand is used as a writing implement, the wand containing a compressed air source and a switching element, and a small airflow tube (9, 15, 21) protruding from the housing (1, 10, 16) of the wand as a drawing- or writing nib. The compressed air source can also be a replaceable capsule (12) filled with a compressed air. It is particularly effective if a blower (19) driven by a battery-powered electric motor (18) is accommodated in the housing (16) of the wand as a compressed air source.

10 Claims, 1 Drawing Sheet

(51) Int. Cl.
*A47J 31/00* (2006.01)
*A23P 20/25* (2016.01)

(56) References Cited

U.S. PATENT DOCUMENTS

| | | | | |
|---|---|---|---|---|
| 2009/0134236 A1* | 5/2009 | Ginelli | ............... | B43K 8/04 |
| | | | | 239/8 |
| 2009/0202686 A1* | 8/2009 | Lavie | ............... | B41M 3/006 |
| | | | | 426/231 |
| 2009/0317519 A1* | 12/2009 | Lavie | ............... | A23L 2/58 |
| | | | | 426/87 |
| 2015/0321908 A1* | 11/2015 | Wagner | ............... | B29C 39/003 |
| | | | | 428/423.1 |
| 2016/0214786 A1* | 7/2016 | Liu | ............... | A63H 33/3094 |

FOREIGN PATENT DOCUMENTS

| | | |
|---|---|---|
| JP | 2001167350 A | 6/2001 |
| JP | 2015142699 A | 8/2015 |

OTHER PUBLICATIONS

English Translation for JP2015142699 published Aug. 2015.*
English Translation for JP2001167350 published Jun. 2001.*
English Translation for FR2495317 published Jun. 1982.*
International Search Report dated Aug. 9, 2017 for PCT/EP2017/065288 and English translation.

* cited by examiner

METHOD AND DEVICE FOR APPLYING DECORATIVE EFFECTS TO A MULTILAYERED COFFEE SURFACE

--CROSS REFERENCE TO RELATED APPLICATION

This Application is a 371 of PCT/EP2017/065288 filed on Jun. 21, 2017, which, in turn, claimed the priority of Austrian Patent Application No. A 50560/2016 filed on Jun. 21, 2016, both applications are incorporated herein by reference.

TECHNICAL FIELD

The invention relates to a method for applying decorative effects to a multi-layered coffee surface, in particular to a crema, and also a device for implementing the method.

STATE OF THE ART

Today coffee in a coffee cup is predominantly served with a light-colored top layer. This top layer is automatically produced in the case of espresso machines and is referred to as the crema. A top layer similar to crema can also be produced by a small quantity of milk froth. Additional structural measures are provided in simple espresso machines in order to create a surface in the manner of a crema.

In many coffee shops or espresso outlets the surface of the coffee is decorated with chocolate powder, by skillfully guiding a small jug of milk froth when pouring onto the surface, or with a pointed rod by means of which patterns can be drawn in the crema or the like.

In addition, a highly complex device is also known in the art which draws pre-programmed designs on a coffee surface with the help of a standard plotter. A mainly brown-colored food additive is used instead of ink.

A complex device of this kind is described in JP 2015142699 A, for example. By means of this device, different edible materials such as melted chocolate, whipping cream or a print medium for an inkjet printer, for example, can be applied to the coffee surface in a decorative arrangement. In addition, in one embodiment an air nozzle can be assigned to the print head, by means of which an air jet is directed at the coffee surface. However, this air jet has a very low pressure at the active point and is used to smooth an uneven froth surface such as occurs with milk froth, for example, so that the print result produced by the subsequently guided print head is improved. A strong focused air jet leading to swirls in the multi-layered surface would be detrimental in this case, as it destroys the print surface.

PRESENTATION OF THE INVENTION

The invention is aimed at a method of applying decorative effects to a multi-layered coffee surface in the coffee cup which permanently achieves the goal without any problems at low cost and without further ingredients.

This is achieved in that a focused air jet for drawing or writing is guided over the surface, wherein the air jet pressure at the active point is selected to overcome the surface tension of the multi-layered surface and to produce swirls between the individual layers. The air jet has a low intensity which is nevertheless sufficient to penetrate the crema, or similar, and selectively blend it with the air or the black coffee located thereunder in a locally limited manner.

The air jet on the one hand forces the crema locally to the side and on the other hand agitates the crema with black coffee in a manner limited to the smallest space, so that the crema changes color there. If the air jet is guided, lines are produced with a distinguishably different color on the light crema or top layer. The effect is long-lasting. The lines, which may represent a flower or a monogram, remain sharp without melting away for a long period. This means that a design or monogram is still clearly visible after roughly 15 minutes. The adjustment of the air jet pressure can be selected by the person skilled in the art according to the respective surface. When setting the pressure, it is very easy to identify the pressure from which swirls appear, as this is where the visible points or lines in a different color occur on the multi-layered surface. The width of the line created can be set by increasing the pressure further.

The invention also relates to a device for implementing the method. This is characterized in that a compressed air source and a switching element, in particular a metering valve for the air jet, and also a preferably longitudinally displaceable small airflow tube which projects beyond the wand are provided in a housing of an elongate, hand-guidable wand.

The wand contains all the components needed to produce a focused air jet. The wand is autonomous and can easily be guided. The switching element allows sensitive switching on and off and also metering of the intensity of the air jet when drawing and writing. In a particular embodiment, the switching element acting as the metering valve lies next to the drawing tip on the jacket of the housing and is actuated using the index finger. In this way, it is possible to regulate the intensity of the air jet by changing the pressure of the index finger on the spring-loaded pushbutton of the switching element.

A pump with a compressed air vessel attached thereto—with a non-return valve at the inlet and a metering valve at the outlet—may be provided as the compressed air source. In a similar way to a retractable pencil, a pushbutton projecting at the upper end is pushed in multiple times against the spring force. The air thereby compressed in a cylinder reaches the compressed air vessel, wherein a non-return valve allows a pressure build-up. The air jet at the tip of the small airflow tube is switched on and controlled via a metering valve.

It is also possible for a replaceable capsule filled with compressed air to be inserted into the wand as the compressed air source. When screwing the wand together or unscrewing a cap, a membrane of the capsule is pierced and with a reduced pressure and the metering valve the air jet can be switched on and the intensity thereof can be regulated as required.

A particularly advantageous embodiment of the invention is characterized in that a blower driven by an electric motor is provided as the compressed air source and an electric switch, possibly with voltage control, as the switching element in the housing. The components are so compact that they easily fit in the wand housing which is roughly 12 to 15 mm in diameter and 80 to 100 mm in length. The intensity of the air jet is controlled by the speed of the blower (fan, turbine).

A wand of this kind according to the invention can be attached in a holder to any espresso machine, so that it is immediately available when making coffee.

Automation is possible if the aforementioned wand can be moved in a computer-controlled manner in an x, y and z direction in a holder of a plotter. The method and devices described are intended first and foremost for simple, cost-effective application available at any time, so that an astonishing effect can be achieved without any problems and without an external power supply to some extent autonomously. If it is embodied as a plotter, the compressed air source may also be arranged outside the wand, for example as an electrically powered radial fan which has a cone with a switch valve at its output and is connected to the wand via a tube.

An advantageous feature in this case is that an ultrasound sensor is arranged on the plotter, by means of which the distance between the wand and the multi-layered surface can be measured, wherein the values determined are used for setting the optimal distance of the wand from the multi-layered surface. So that the focused air jet achieves an optimal result, apart from the guidance in both horizontal spatial directions, it is also important for the correct distance from the multi-layered surface to be set. Since the filling level in the vessel is not always constant, the distance of the wand must be realigned with each application. To this end, the distance can be determined by means of an ultrasound sensor arranged on the plotter, following which the height of the wand is adjusted accordingly in order to achieve an optimum result.

BRIEF DESCRIPTION OF THE DRAWINGS

Exemplary embodiments for implementing the method are schematically depicted in the figures.

METHOD(S) OF IMPLEMENTING THE INVENTION

Figure 1:
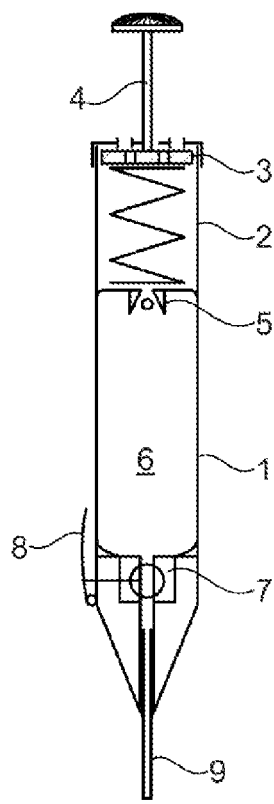
FIG. 1 shows a slightly enlarged longitudinal section through a wand with a pump

According to FIG. 1, a pump 2 is housed in a tubular housing 1 of a wand, the piston 3 of said pump being actuable by means of a pushbutton 4. The pump is attached to a compressed air vessel 6 via a non-return valve 5 (ball valve). A metering valve 7 is located at the outlet of said vessel, which valve can be opened more or less wide by means of a pushbutton 8 depending on the pushbutton pressure. A small airflow tube 9 that is telescopic in this case is attached to the metering valve 7. This acts as a drawing or writing nib, as soon as a compressed air jet is released via the pushbutton 8. The tip of the small tube is guided just above the crema or the surface of the coffee and in this way decorative effects or lettering can be applied to this surface.

Figure 2:
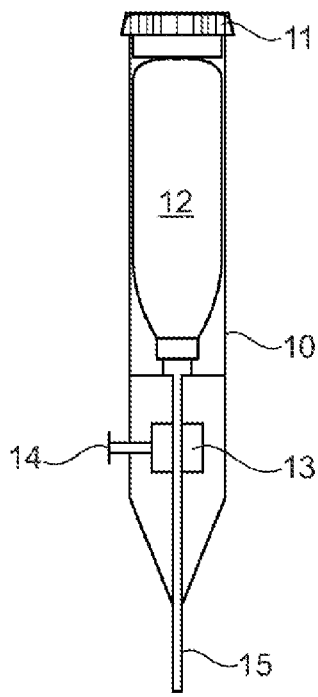
FIG. 2 shows a screwable wand with a replaceable capsule for compressed air

An embodiment according to FIG. 2 again comprises a slim, small tube-shaped wand housing 10 with a screw cap 11 at the upper end. In the upper part of the housing, space is provided for a replaceable capsule 12 with compressed air. Following insertion by screwing on the screw cap 11, this is pressed against a hollow spike, a sealing membrane of the capsule 12 is pierced and the compressed air is supplied. A subsequent metering valve 13 with pressure reduction is actuated by a pushbutton 14. The deeper the pushbutton 14 is pressed into the housing against the spring force, the more air reaches the subsequent small airflow tube 15. The wand according to FIGS. 1 to 3 is held in a similar manner to a writing instrument and the metering switch-on of the focused air flow for drawing or writing on the crema or surface of the coffee in the cup is achieved with the index finger.

Figure 3:
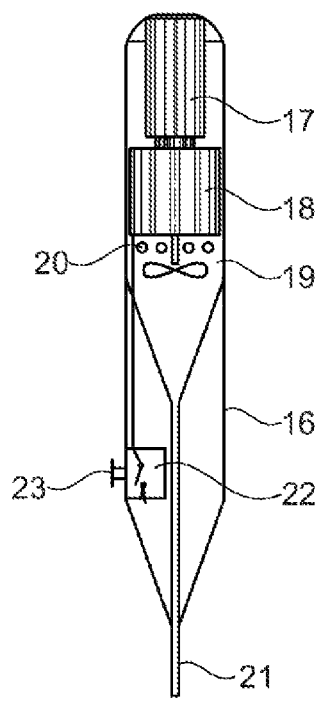
FIG. 3 shows a wand with an electric fan and FIGS. 4 and 5 show a theoretical arrangement with plotter guidance of a wand according to FIG. 3.

According to FIG. 3, in the upper part of a circular cylindrical wand housing 16 are provided a replaceable battery 17 and an electric motor 18 which drives a fan wheel of a blower 19. Suction openings 20 are provided in the housing 16. The air flow of the blower 19 reaches the tip of the small tube via a nozzle in a small airflow tube 21 where it escapes. A switching element in the form of an electrical switch 22 applies voltage from battery 17 to the electric motor 18. This switch is actuated with the help of a pushbutton 23. The switch arrangement may also be configured as a speed controller for the electric motor 18.

Figure 4:
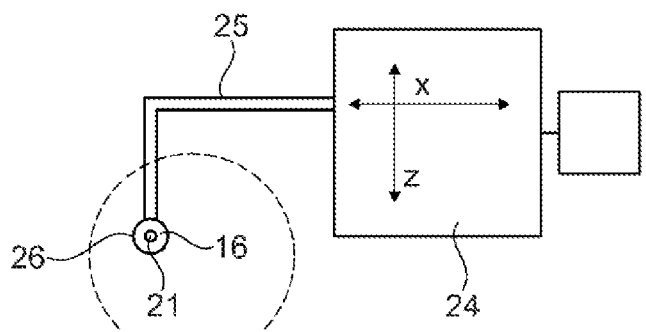
Figure 5:

FIGS. 4 and 5 relate to the use of a plotter 24 with an arm 25 that can be displaced in the x-z plane which supports a holder 26 for a wand—preferably the wand according to FIG. 3. The plotter 24 is controlled by a computer 27 in which various surface designs, monograms or the like, are stored for retrieval. In this way, decorative elements can be depicted on the surface 28, in particular on the crema of a coffee in a coffee cup 29, by the focused air jet.

The invention claimed is:

1. A method for applying decorative effects to a multi-layered coffee surface, a focused air jet for drawing is guided over the surface, wherein the air jet pressure at an active point is selected to overcome the surface tension of the multi-layered surface and to produce swirls between the individual layers.

2. A device for implementing the method as claimed in claim 1, wherein a compressed air source and a switching element, and also a longitudinally displaceable small airflow tube which projects beyond the wand are provided in a housing of an elongate, hand-guidable wand.

3. The device as claimed in claim 2, wherein the compressed air source is a pump with a compressed air vessel attached thereto.

4. The device as claimed in claim 2, wherein the compressed air source is a replaceable capsule filled with compressed air.

5. The device as claimed in claim 2, wherein a blower driven by an electric motor is provided as the compressed air source and an electric switch as the switching element in the housing of the wand.

6. The device as claimed in claim 5, wherein the wand can be moved in a computer-controlled manner in an x, y and z direction in a holder of a plotter.

7. The device as claimed in claim 6, wherein an ultrasound sensor is arranged on the plotter, by means of which the distance between the wand and the multi-layered surface can be measured, wherein distance values determined are used for setting the optimal distance of the wand from the multi-layered surface.

8. The method according to claim 1, wherein the coffee surface is a crema.

9. The device as claimed in claim 2, wherein the switching element is a metering valve for an air jet.

10. The device as claimed in claim 5, wherein the electric switch is voltage controlled.

* * * * *